US008543552B2

(12) United States Patent  (10) Patent No.: US 8,543,552 B2
Jain et al. (45) Date of Patent: Sep. 24, 2013

(54) DETECTING STATISTICAL VARIATION FROM UNCLASSIFIED PROCESS LOG

(75) Inventors: Anshu N. Jain, Karnataka (IN); Krishna Kummamuru, Hyderabad (IN); Srikanth G. Tamilselvam, Tamil Nadu (IN)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 13/363,466

(22) Filed: Feb. 1, 2012

(65) Prior Publication Data

US 2013/0198147 A1    Aug. 1, 2013

(51) Int. Cl.
*G06F 7/00* (2006.01)
*G06F 17/00* (2006.01)

(52) U.S. Cl.
USPC .................................................. 707/688

(58) Field of Classification Search
None
See application file for complete search history.

(56) References Cited

U.S. PATENT DOCUMENTS

| 4,414,629 | A | 11/1983 | Waite |
| 4,954,981 | A | 9/1990 | Dehner, Jr. et al. |
| 6,704,015 | B1* | 3/2004 | Bovarnick et al. ......... 345/440.2 |
| 6,886,010 | B2 | 4/2005 | Kostoff |
| 6,985,779 | B2 | 1/2006 | Hsiung et al. |
| 7,295,967 | B2 | 11/2007 | Corman et al. |
| 7,373,332 | B2* | 5/2008 | Heumann et al. ............... 706/16 |
| 7,490,287 | B2 | 2/2009 | Sakurai |
| 7,565,271 | B2* | 7/2009 | Bramwell et al. ............ 702/183 |
| 7,716,011 | B2 | 5/2010 | Thibaux et al. |
| 2006/0015367 | A1* | 1/2006 | Taylor et al. ...................... 705/2 |
| 2006/0173668 | A1 | 8/2006 | Haigh et al. |
| 2008/0188972 | A1* | 8/2008 | Miller ........................... 700/110 |
| 2009/0228525 | A1* | 9/2009 | Fridrich ........................ 707/201 |
| 2010/0235308 | A1 | 9/2010 | Takamatsu |

FOREIGN PATENT DOCUMENTS

| CN | 101201917 | 6/2008 |
| JP | 2005149489 | 6/2005 |
| JP | 2009187295 | 8/2009 |
| WO | 2010067565 | 6/2010 |

OTHER PUBLICATIONS

Wisner, Statistical Process Control for Quality Improvement, QFINANCE, Retrieved from the Internet: < URL: www.qfinance.com>, pp. 1-8.

(Continued)

*Primary Examiner* — Uyen Le
(74) *Attorney, Agent, or Firm* — Schmeiser, Olsen & Watts, LLP; John Pivnichny

(57) ABSTRACT

A system and associated method for detecting a statistical variation of a process from a textual log of the process as performed by a process behavior analysis (PBA) system for monitoring the process operating in an Information Technology (IT) delivery system. The PBA system includes a PBA engine and a data storage storing exception rules used by the PBA engine. The PBA engine merges entities appearing in the textual log into one or more groups based on similarities of respective time series of the entities. Control charts are generated for merged entities and the PBA engine subsequently analyzes process behavior of the process by use of the control charts for exceptions defined in the stored exception rules. The PBA engine generates a PBA report for the process pursuant to the analysis result of the textual log with detailed information including to what type of exceptions had or had not occurred.

20 Claims, 9 Drawing Sheets

(56) References Cited

OTHER PUBLICATIONS

Visweswariah et al., Process Behavior Analysis: Mechanism to Enable Superior Customer Experience, 2010 IEEE International Conference on Services Computing, 978-0-7695-4126-6/10 DOI 10.1109/SCC.2010.96, pp. 394-401.

Zadrozny et al., MITSloan Management Review, Leveraging the Power of Intangible Assets, Fall 2006, vol. 48, No. 1, pp. 85-91.

United States Coast Guard, Process Improvement Guide, Total Quality Tools for Teams and Individuals, Second Edition, Jan. 1994, pp. 1-81.

* cited by examiner

DETECTING STATISTICAL VARIATION FROM UNCLASSIFIED PROCESS LOG

BACKGROUND OF THE INVENTION

The present invention discloses a system and associated method for processing and reporting process behavior by use of raw process logs for computing service framework performance. Conventionally, statistical process control (SPC) that has been commonly used in quality control of manufacturing process is also used based on categorized data to find out anomalies in the computing service framework performance. Conventional SPC requires categorized quality parameters, which makes the SPC inaccurate and time-consuming.

BRIEF SUMMARY

According to one embodiment of the present invention, a method for detecting a statistical variation of a process operating in an Information Technology (IT) delivery system from a textual log of the process, the method comprises: grouping, by a process behavior analysis (PBA) engine, entities appearing in the textual log of the process based on a respective time series corresponding to each entity of said entities, wherein a data storage operatively coupled to the PBA engine stores the textual log of the process and at least one exception rule defining the statistical variation used by the PBA engine; analyzing statistical process behavior of the process by running the PBA engine with the entities from said grouping such that each entity of said entities is represented by a respective control chart associated with said each entity and such that the PBA engine is enabled to determine whether said each entity violates said at least one exception rule; and generating a PBA report for the process pursuant to a result from said analyzing, wherein the PBA report comprises data items selected from the group consisting of a first time window within which a first time series of a first entity of the entities in the textual log is being monitored by the PBA engine for the statistical variation, a second entity being grouped with the first entity, a first shift value for a first exception detected for the first entity, and combinations thereof.

According to one embodiment of the present invention, a computer program product comprises a computer readable memory unit that embodies a computer readable program code. The computer readable program code contains instructions that, when run by a processor of a computer system, implement aforementioned detecting a statistical variation of a process operating in the IT delivery system from a textual log of the process.

According to one embodiment of the present invention, a computer system comprises a processor, a memory coupled to the processor, and a computer readable storage device coupled to the processor, said storage device containing program code configured to be executed by the processor via the memory to implement aforementioned detecting a statistical variation of a process operating in the IT delivery system from a textual log of the process.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing aforementioned detecting a statistical variation of a process operating in the IT delivery system from a textual log of the process.

DETAILED DESCRIPTION

Figure 1:
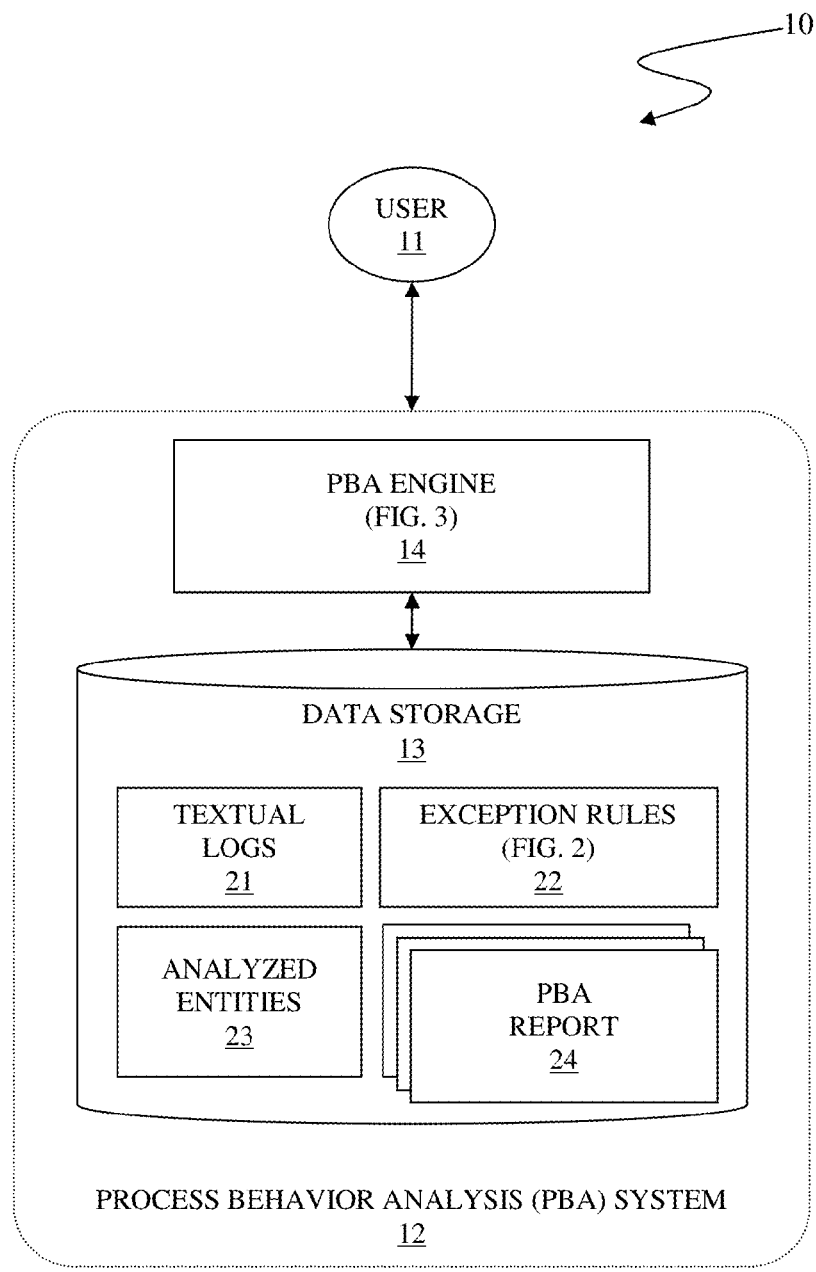
FIG. 1 illustrates a system for detecting statistical variations in behavior of a process based on textual logs recorded by the process, in accordance with embodiments of the present invention.

FIG. 1 illustrates a system 10 for detecting statistical variations in behaviors of a process based on textual logs recorded by the process, in accordance with embodiments of the present invention.

The system 10 comprises a user 11 and a process behavior analysis (PBA) system 12. The user 11 is a human user interacting with the PBA system 12 for a time series analysis of unstructured data. Examples of the user 11 may be, inter alia, an analyst, management personnel, etc. The user 11 provides input data to the PBA system 12. The user 11 also queries specifics of the PBA system 12 and receives a result of such queries. Examples of items in the result received by the user 11 may be, inter alia, types of statistical variations, a respective time window of statistical variation, unstable phrases appearing in desired types of statistical variations, top K number of unstable phrases, etc. In this specification, terms "statistical variation", "statistical dispersion", "statistical variability" and "variation" are used interchangeably to indicate variability or spread in a variable or a probability distribution of statistical samples.

The PBA system 12 comprises data storage 13 and a process behavior analysis (PBA) engine 14. The data storage 13 comprises textual logs 21, exception rules 22, analyzed entities 23, and at least one PBA report. The data storage 13 stores indices associated with problems in the textual logs 21 by use of a flat file or a sophisticated database system.

The PBA engine 14 receives input from the user 11 and/or the data storage 13, builds indices for the input, interprets queries from the user 11, analyzes behaviors of a process based on the input and queries, generates and stores intermediary results of analyzed entities 23, generates and stores a PBA report 24 of said at least one PBA report in the data storage 13, and communicates the PBA report 24 to the user 11. See description of FIGS. 3, 4A, 4B, and 4C infra for details of steps performed by the PBA engine 14.

The PBA engine 14 statistically analyzes the textual logs 21 in raw process log state as being recorded by the process of an Information Technology (IT) delivery system without explicitly classifying the textual logs 21 prior to a statistical analysis as used in conventional statistical process control (SPC) systems. The textual logs 21 comprise at least one entity that is a respective phrase describing problems of the IT delivery system in which the PBA system 12 is interested. The PBA engine 14 extracts entities from the textual logs 21 and groups the extracted entities by variations in a time series associated with the respective entities. The PBA engine 14 automatically performs entity extraction in combination with SPC time series analysis. The PBA engine 14 improves precision and recall in detection of pervasive events which result in process variations by increasing a scope of SPC analysis to all significant entities in the textual logs 21, in contrast with the conventional SPC system covering only explicit classes predefined for statistical analysis. The PBA engine 14 directly generates the PBA report 24 comprising information describing the behavior of the process including critical points of failures such as a server identifier, an application name, and/or a failure cause, etc., without performing multi-stage root cause analysis as in the conventional SPC system.

The textual logs 21 is a time series recording process behaviors of the process as a sequence of data points measured typically at successive times spaced at uniform time intervals in generating statistically meaningful data. Examples of time series may be, inter alia, daily stock market index, monthly precipitation for a specific geographic area, etc. See FIGS. 5A and 5B infra for examples of phrases. In this specification, terms "unclassified log", "process log", "log", and "textual log" are used interchangeably to indicate the time series in text form as recorded by the process but not classified for statistical analysis. Also in this specification, terms "process behavior" and "behavior" are used interchangeably to represent items recorded in the process log by the process regarding operations of the process and/or problems occurring during the operations of the process, etc.

The exception rules 22 determine which process variation is statistically exceptional. In this specification, a process variation is represented by a respective control chart for each time series. A control chart is a statistical tool used to distinguish process variation from a common cause and an exceptional cause. The control chart comprises a center mean line ($\overline{X}$), an upper control limit (UCL), and a lower control limit (LCL). In one embodiment of the present invention, the UCL and the LCL are three (3) times the range of a standard error ($\sigma$, Sigma) away from the mean, in both directions. In another embodiment of the present invention, the UCL and the LCL are determined based on customer requirement, which is referred to as specification limits. See description of FIG. 2 infra for details of the exception rules 22.

Figure 3:
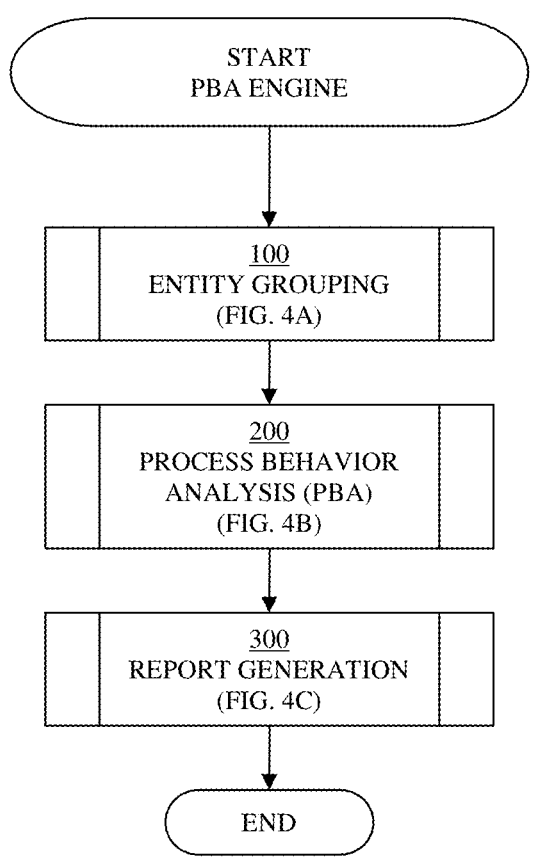
FIG. 3 is a flowchart depicting a method for detecting process variations based on textual logs, as performed by the PBA engine of FIG. 1, in accordance with the first embodiment of the present invention.

The analyzed entities 23 are generated by the PBA engine 14 as a result of process behavior analysis performed at step 200 of FIG. 3 infra, upon the textual logs 22 as input.

The PBA report 24 comprises a control chart generated by the PBA engine 14 in response to a query from the user 11. The PBA report 24 may further comprise a time window within which a respective exception had occurred, a type of an exception, etc. See FIGS. 5A and 5B infra for exemplary components of the PBA report 24.

Figure 2:
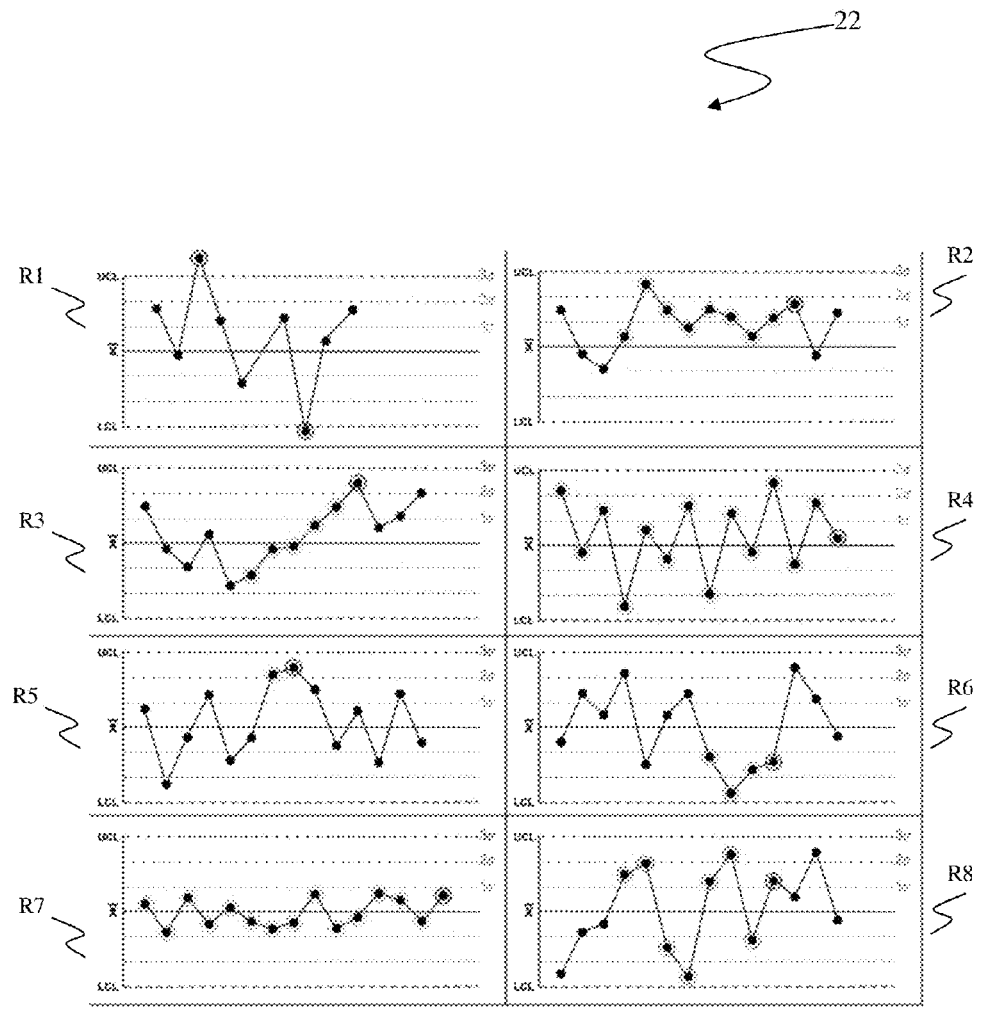
FIG. 2 illustrates control charts representing the exception rules 22 of the PBA system 12 in FIG. 1, in accordance with the embodiments of the present invention.

FIG. 2 illustrates control charts representing the exception rules 22 of the PBA system 12 in FIG. 1 supra, in accordance with the embodiments of the present invention.

In statistical process control (SPC), a process variation represented in a respective control chart showing a time series quantifying status of each process. The process variation is of either a normal type or an exceptional type. If a time series of the process vary within control limits, then the process variation is normal, which indicates that the process behaves consistently enough to statistically predict future performance of the process. If a time series of the process vary significantly enough to meet a condition set forth in the exception rules, then the process variation is exceptional, which indicates that the process behavior is unstable and in need of human intervention to find a root cause of such behavior and to stabilize the process behavior for future performance of the process to be predictable. In this specification, the term "exception" is defined as a process variation of an exceptional type or such process.

In one embodiment of the present invention, the exception rules 22 comprise eight (8) exception rules defining a respective exception. See description of FIG. 1 supra for legends used in control charts of the exception rules 22.

A first exception rule R1 represents a first exception type wherein a data point is away from the mean by the control limit ($3\sigma$), that is, the data point is less than the LCL or greater than the UCL.

A second exception rule R2 represents a second exception type wherein nine (9) or more data points in a row are either greater than the mean or less than the mean. In another embodiment of the present invention, the second exception rule R2' represents the second exception type wherein seven (7) or more data points in a row are either greater than the mean or less than the mean.

A third exception rule R3 represents a third exception type wherein six (6) or more data points in a row show a continuous increase or a decrease.

A fourth exception rule R4 represents a fourth exception type wherein fourteen (14) or more data points in a row are in alternate directions one after another.

A fifth exception rule R5 represents a fifth exception type wherein at least two (2) out of three (3) data points in a row are away from the mean by variances larger than two-third of the control limit ($2\sigma$) in a same direction.

A sixth exception rule R6 represents a sixth exception type wherein at least four (4) out of five (5) data points in a row are away from the mean by variances larger than one-third of the control limit ($\sigma$) in one side of the mean.

A seventh exception rule R7 represents a seventh exception type wherein fifteen (15) data points in a row are all within a range of one-third of the control limit (a) from the mean on either side of the mean.

Finally, an eighth exception rule R8 represents an eighth exception type wherein eight (8) data points in a row are away from the mean by one-third of the control limit (a) on both sides of the mean.

FIG. 3 is a flowchart depicting a method for detecting process variations based on textual logs, as performed by the PBA engine of FIG. 1 supra, in accordance with the first embodiment of the present invention.

In step 100, the PBA engine performs grouping of entities appearing in the textual logs stored in the data storage. See descriptions of FIG. 4A infra for details of entity grouping performed in step 100. Then the PBA engine proceeds with step 200.

In step 200, the PBA engine analyzes process behavior of each group of entities resulting from step 100 supra. See descriptions of FIG. 4B infra for details of the process behavior analysis (PBA) performed in step 200. Then the PBA engine proceeds with step 300.

In step 300, the PBA engine generates PBA reports based on the PBA performed in step 200 supra and communicates the generated PBA reports to the user. See descriptions of FIG. 4C infra for details of the PBA report generation performed in step 300. Then the PBA engine terminates processing the textual logs. The PBA engine may loop back to step 100 supra for processing another body of textual logs.

Figure 4A:
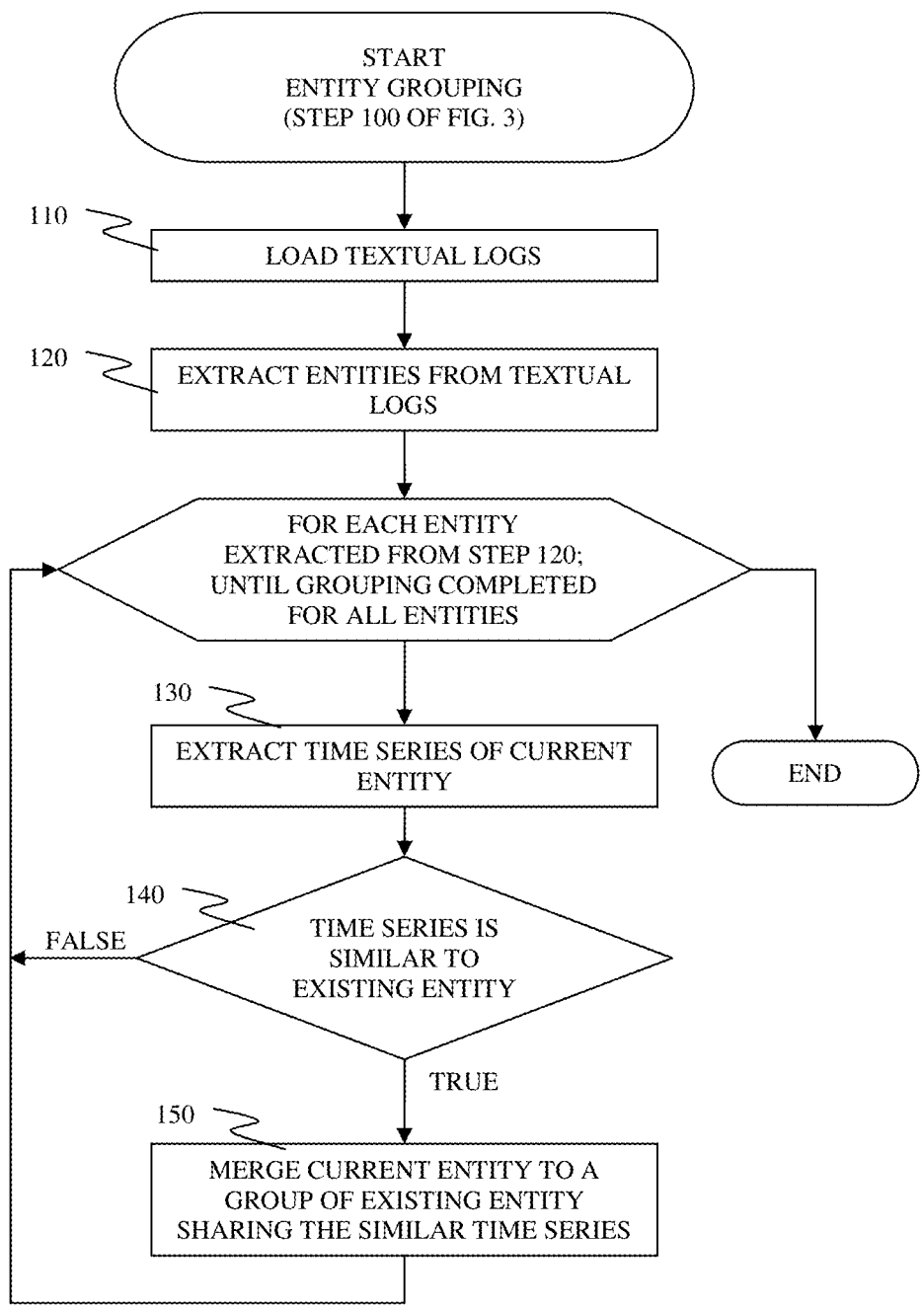
FIG. 4A is a flowchart depicting a method for detecting process variations based on textual logs, as performed in step 100 of FIG. 3, in accordance with the first embodiment of the present invention.

FIG. 4A is a flowchart depicting a method for detecting process variations based on textual logs, as performed in step 100 of FIG. 3 supra, in accordance with the first embodiment of the present invention.

In step 110, the PBA engine loads the textual logs from the data storage for processing. Then the PBA engine proceeds with step 120.

In step 120, the PBA engine extracts entities from the loaded textual logs. Then the PBA engine proceeds with step 130.

Steps 130 through 150 are performed as a unit for each entity extracted in step 120 supra. Upon completing entity grouping for all entities, the PBA engine terminates step 100 and proceeds with step 200 of FIG. 3 supra.

In step 130, the PBA engine extracts a time series corresponding to a current entity. Then the PBA engine proceeds with step 140.

In step 140, the PBA engine determines whether or not the time series of the current entity is similar to a time series corresponding to an existing entity by comparing respective curves associated with the time series of the current entity and another time series of the existing entity pursuant to the exception rules stored in the data storage. If the PBA engine determines that the time series of the current entity is similar to a time series corresponding to an existing entity, then the PBA engine proceeds with step 150. If the PBA engine determines that the time series of the current entity is not similar to a time series corresponding to any existing entity, then the PBA engine loops back to step 130 supra to replace the current entity with a new entity that has not been processed yet.

In step 150, the PBA engine merges the current entity with the existing entity found to have a similar time series as the current entity in step 140 supra, by resulting in a new group of entities sharing the similar time series. Wherein the existing entity is already in a group, the current entity is added to the group without creating the new group. Entities in one group demonstrate a process behavior trend within thresholds respective to each exception rule. Then the PBA engine loops back to step 130 supra to replace the current entity with a new entity that has not been processed yet.

Figure 4B:
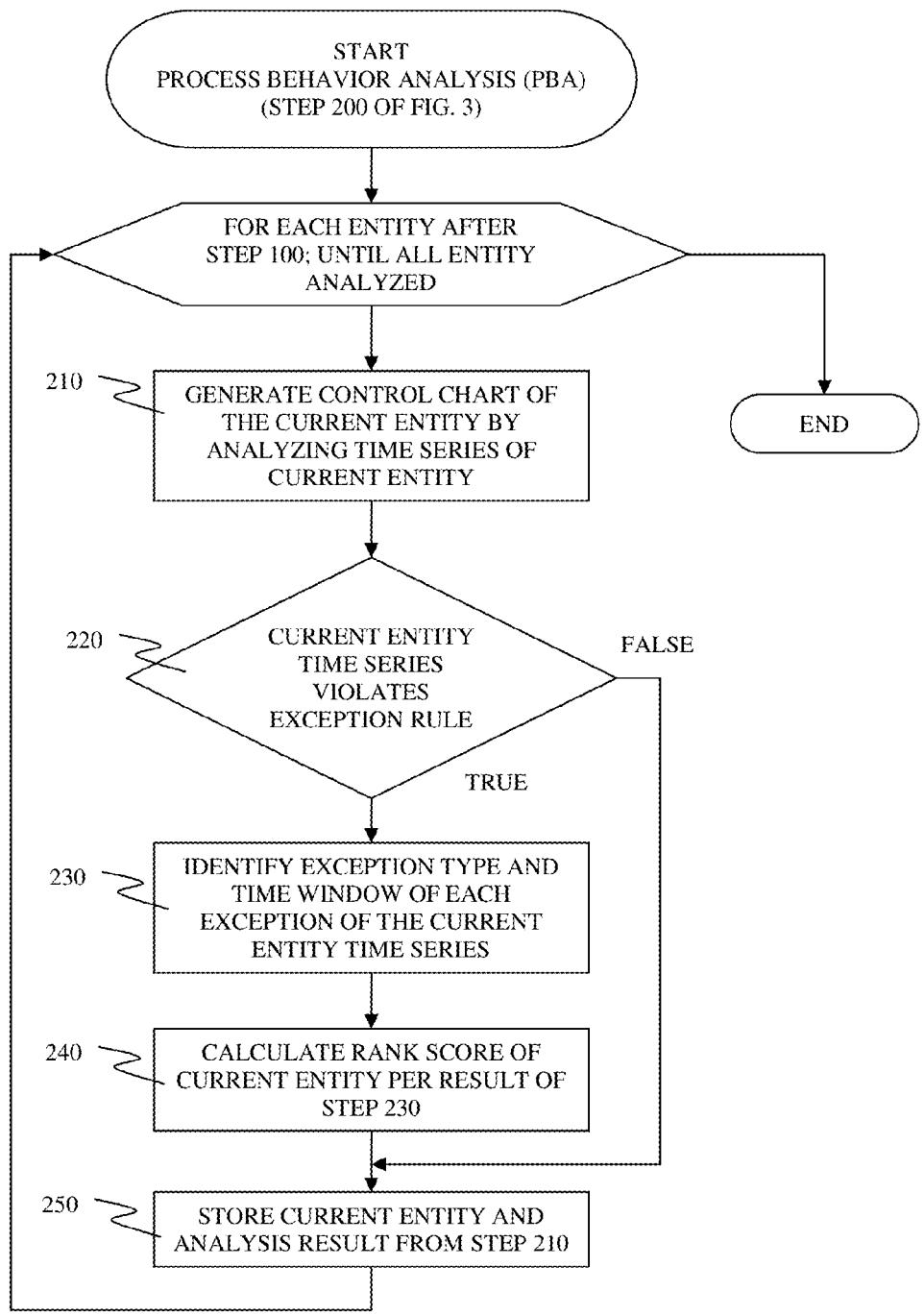
FIG. 4B is a flowchart depicting a method for detecting process variations based on textual logs, as performed in step 200 of FIG. 3, in accordance with the first embodiment of the present invention.

FIG. 4B is a flowchart depicting a method for detecting process variations based on textual logs, as performed in step 200 of FIG. 3 supra, in accordance with the first embodiment of the present invention.

Steps 210 through 250 are performed as a unit for each entity after step 100 of FIG. 3 supra. Upon completing analyzing all grouped entities, the PBA engine terminates step 200 and proceeds with step 300 of FIG. 3 supra.

In step 210, the PBA engine analyzes process behavior of the current entity by examining the time series corresponding to the current entity and subsequently generating a control chart associated with the time series of the current entity as an analysis result. The PBA engine may employ conventional PBA method in generating a control chart corresponding to the time series of the current entity. Then the PBA engine proceeds with step 220.

In step 220, the PBA engine determines if the time series of the current entity violates any one of the exception rules stored in the data storage. If the PBA engine determines that the time series of the current entity violates an exception rule, then the PBA engine proceeds with step 230. If the PBA engine determines that the time series of the current entity does not violate any exception rule, then the PBA engine proceeds with step 250.

In step 230, the PBA engine identifies types of exceptional process variations, or simply exception types, of the time series of the current entity as well as a respective time window of each exception occurring in the time series of the current entity. Then the PBA engine proceeds with step 240.

In step 240, the PBA engine calculates a rank score associated with the current entity for ranking the current entity within the respective entity group based on heuristics. An entity having a higher rank indicates a more significant defect in the process behavior than an entity having a lower rank. The PBA engine maintains information on rank scores of respective entities in each type of the exception as defined in the exception rules. Then the PBA engine proceeds with step 250.

In step 250, the PBA engine stores the current entity and the analysis result generated from step 210 supra for future report generation. Then the PBA engine loops back to step 210 supra.

Figure 4C:
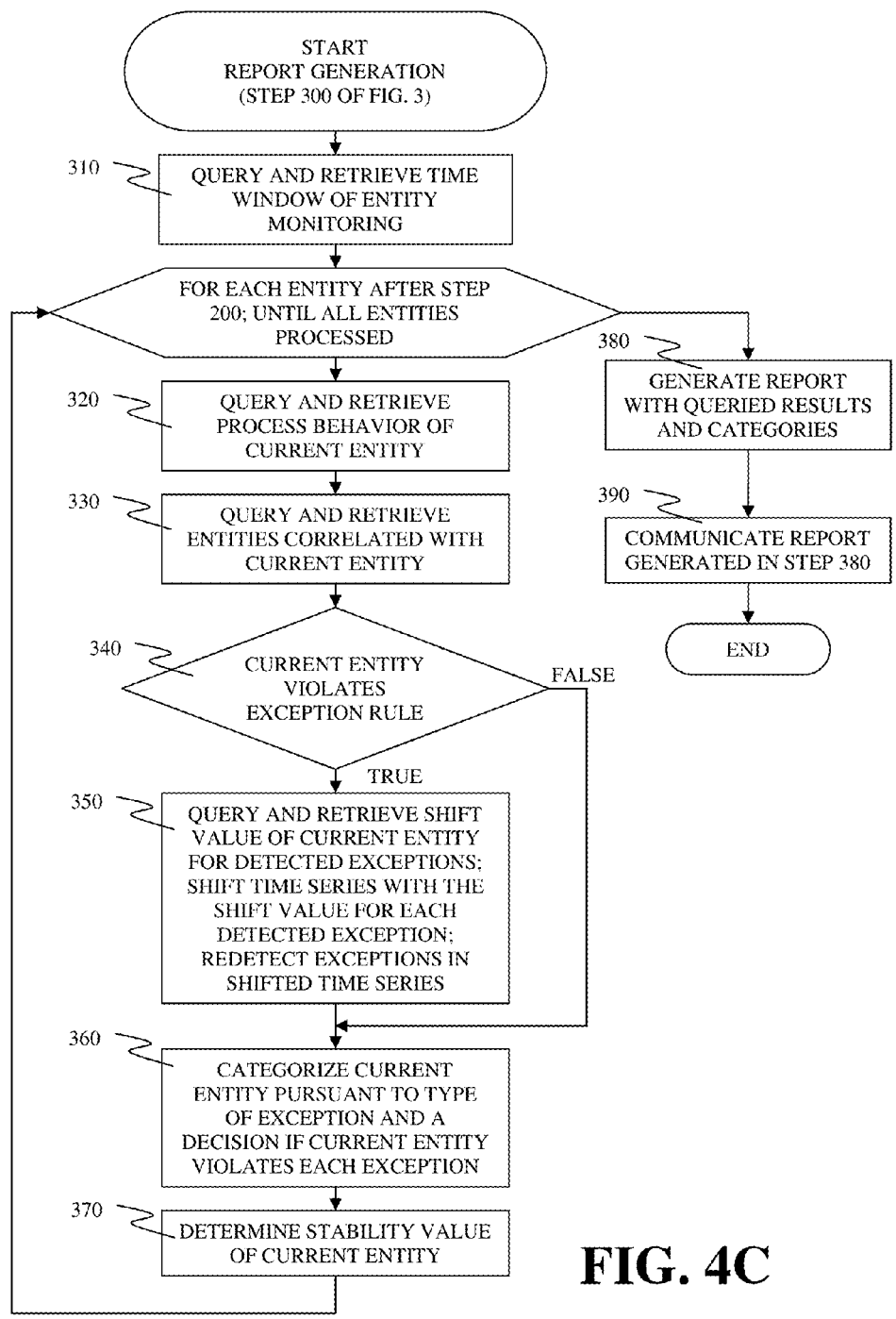
FIG. 4C is a flowchart depicting a method for detecting process variations based on textual logs, as performed in step 300 of FIG. 3, in accordance with the first embodiment of the present invention.

FIG. 4C is a flowchart depicting a method for detecting process variations based on textual logs, as performed in step 300 of FIG. 3 supra, in accordance with the first embodiment of the present invention.

In step 310, the PBA engine queries and retrieves, to and from the data storage storing data items, a time window that is a portion of the time series of all entities subject to the report generation and monitoring. In another embodiment, step 310 is skipped, which results in analyzing a whole time series for all entities. Then the PBA engine proceeds with step 320.

The PBA engine performs steps 320 to 370 for each entity analyzed from step 200 of FIG. 3 supra. Upon processing all entities subject to monitoring with steps 320 through 370, the PBA engine proceeds with step 380.

In step 320, the PBA engine queries and retrieves a process behavior of a current entity, which is a time series representing the process behavior of the current entity. Then the PBA engine proceeds with step 330.

In step 330, the PBA engine queries and retrieves entities correlated with the current entity. In this specification, correlated entities indicate other entities in the same group sharing the similar time series with the current entity as entities that had been merged in step 150 of FIG. 4A supra. Then the PBA engine proceeds with step 340. In another embodiment of the present invention, the PBA engine proceeds with step 360, without performing steps 340 and 350 as an optional unit.

In step 340, the PBA engine determines if the current entity violates any one of the exception rules stored in the data storage. If the PBA engine determines that the current entity violates at least one exception rule, then the PBA engine proceeds with step 350. If the PBA engine determines that the current entity does not violate any exception rule, then the PBA engine proceeds with step 360.

In step 350, the PBA engine queries and retrieves a shift value of the current entity as the current entity is an exception. The shift value of the current entity defines a point of time in the time series for the current entity on which the exception detected in step 340 supra begins. The PBA engine subsequently shifts the time series of the current entity by resetting the time series of the current entity to the shift point, reexamines the shifted time series for exceptions pursuant to the exception rules, and updates the detected exceptions discovered in step 340 supra with the exceptions detected in the reexamination by the shift value. Then the PBA engine proceeds with step 360. Wherein steps 340 and 350 are collectively skipped, the analysis report does not have the shift value information corresponding to respective exceptions.

In step 360, the PBA engine categorizes the current entity into zero or more categories pursuant to each type of exception as determined by the exception rule. Each category of said zero or more categories has exceptions of similar properties. Wherein the time series of the current entity shows more than one exception, the current entity may be categorized into multiple categories. Then the PBA engine proceeds with step 370.

In step 370, the PBA engine determines a stability value of the time series of the current entity, which defines an average distance of data points in the time series of the current entity on the time series from the mean values. A smaller stability value of a first entity indicates that the first entity is more stable than a second entity having a stability value larger than the first entity, as the time series of the first entity is kept close to the mean values of the time series than the time series of the second entity. Then the PBA engine loops back to step 320 supra for a next entity.

In step 380, the PBA engine generates a PBA report with results retrieved from previous steps, as selected per embodiments from steps 310 through 370. In the first embodiment of the present invention, the PBA report comprises the time window for monitoring obtained from step 310, the process behaviors obtained from step 320, correlated entities in a group same as the current entity obtained from step 330, violated exception rule and corresponding shift value for respective exceptions obtained from steps 340 and 350, category information obtained from step 360, and stability values obtained from step 370, for all entities. Then the PBA engine proceeds with step 390.

In a second embodiment wherein step 310 is skipped, the PBA report comprises the process behaviors obtained from step 320, correlated entities in a group same as the current entity obtained from step 330, violated exception rule and corresponding shift value for respective exceptions obtained from steps 340 and 350, category information obtained from step 360, and stability values obtained from step 370, for all entities.

In a third embodiment wherein steps 340 and 350 are skipped, the PBA report comprises the time window for monitoring obtained from step 310, the process behaviors obtained from step 320, correlated entities in a group same as the current entity obtained from step 330, category information obtained from step 360, and stability values obtained from step 370, for all entities.

In a fourth embodiment wherein steps 310, 340, and 350 are skipped, the PBA report comprises the process behaviors obtained from step 320, correlated entities in a group same as the current entity obtained from step 330, category information obtained from step 360, and stability values obtained from step 370, for all entities.

In step 390, the PBA engine communicates the PBA report generated in step 380 supra to the user. Then the PBA engine terminates processing the textual logs for process behavior analysis.

Figure 5:
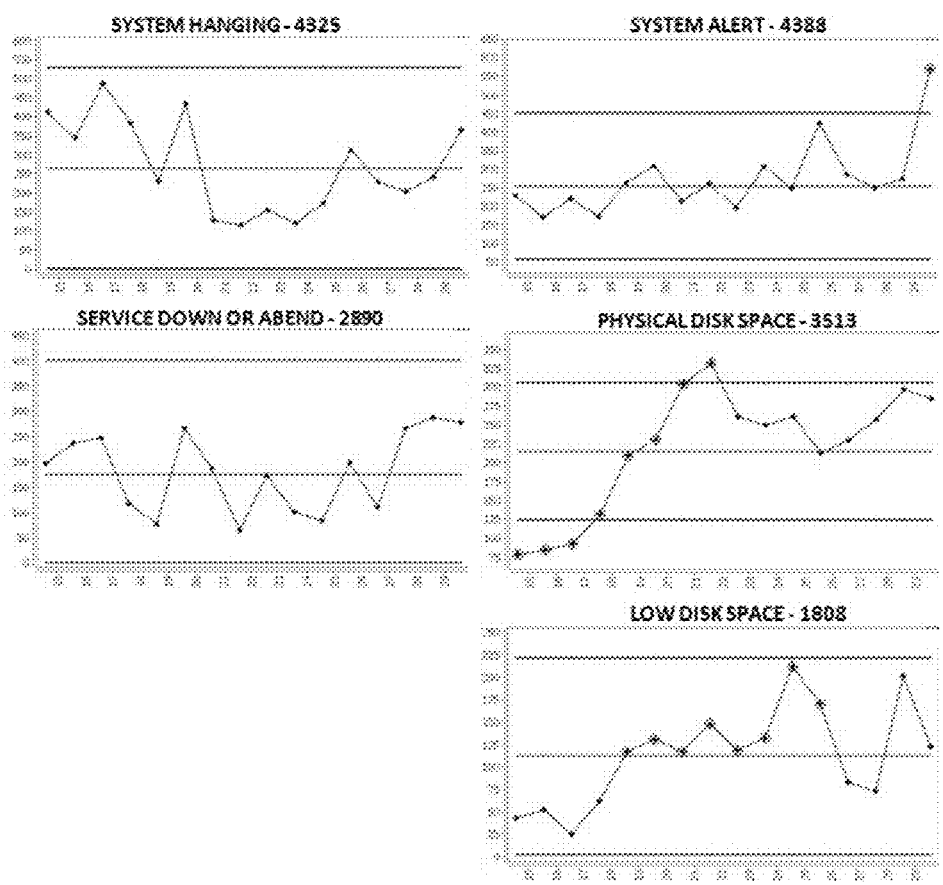
FIG. 5 is an example of process control charts for top five (5) symptoms discovered from a Pareto analysis of classified process log data as in conventional process behavior analysis methods.

FIG. 5 is an example of process control charts for top five (5) symptoms discovered from a Pareto analysis of classified process log data as in conventional process behavior analysis methods.

The process log data of FIG. 5 example comprises at least nine (9) attributes of ProblemID, FailureClass, Symptom, Summary, Resolution, OpenDate, ResolveDate, TotalTTR, and ConfigItem, wherein ProblemID is a unique identifier of an incident being logged within an IT delivery system, FailureClass is a high-level classification describing a general area of the incident, Symptom is a low-level classification describing a type of the incident, Summary is a text description of the incident in natural language input in conjunction with system messages and status information, Resolution is another text description of a resolution applied to the incident to solve the incident, OpenDate is a first date info when the incident log was opened, ResolveDate is a second date info when the incident log was resolved, TotalTTR is amount of time taken to resolve the incident, and ConfigItem is any entity of the IT delivery system that is affected by the incident.

In conventional Process Behavior Analysis (PBA) of FIG. 5, average and limit for determining exception are calculated by from sample of the process log data for each class first. Wherein a class has an exception defined by exception rules, subclasses of the exceptional class are analyzed for exception per symptom/subclass.

The top-5 most frequent symptoms in FIG. 5 are identified as "SYSTEM ALERT", "SYSTEM HANGING", "PHYSICAL DISK SPACE", "SERVICE DOWN . . . ", and "LOGICAL DISK SPACE", comprising eighty percent (80%) of all exceptions in the process log data. In this specification, terms "subclass exception" and "symptom" are used interchangeably to indicate sub-categories of exceptions smaller than classes. The subclasses/symptom may be a member of respective broader categories/classes of exceptions as employed in one embodiment of categorization performed in step 360 of FIG. 4C supra. Examples of the broader categories/classes associated with symptoms/subclasses of FIG. 5 may be, inter alia, OS_SYS, CAPACITY, APPLICATION, PROCESS, FACILITIES, NETWORK, BACKUP_RESTORE, HARDWARE, FILE_SYSTEM, etc.

A first symptom "SYSTEM ALERT" occurred 4388 times and the process behaviors in "SYSTEM ALERT" subclass acted abnormally as specified as the first exception rule R1 having type "Upper Limit Violation" from FIG. 2 supra.

A second symptom "SYSTEM HANGING" occurred 4325 times and the process behaviors in "SYSTEM HANGING" subclass did not violate any exception rule defined from FIG. 2 supra in the data storage.

A third symptom "PHYSICAL DISK SPACE" occurred 3513 times and the process behaviors in "PHYSICAL DISK SPACE" subclass acted abnormally as specified as the third exception rule R3 having type "Six (6) Up Trend Violation" from FIG. 2 supra.

A fourth symptom "SERVICE DOWN OR ABEND" occurred 2890 times and the process behaviors in "SERVICE DOWN OR ABEND" subclass did not violate any exception rule defined from FIG. 2 supra in the data storage.

A fifth symptom "LOW DISK SPACE" occurred 1808 times, as represented as "LOGICAL DISK SPACE" in FIG. 5A supra, and the process behaviors in "LOW DISK SPACE" subclass acted abnormally as specified as a variation of the second exception rule R2 having type "Eight (8) Points Above Mean Violation" from FIG. 2 supra.

Examples of highly frequent phrases found in exceptional symptoms in FIG. 5, that are "SYSTEM ALERT", "PHYSICAL DISK SPACE", and "LOW DISK SPACE", may be, inter alia, "high space", "threshold on volume", "serial number", "svr1-appl", "svr1-appd", "violated svr1", "prju-appl", "serial number 80bf48bc has been violated", "svr1-appt", etc. Note that the highly frequent phrases are not necessarily related to exceptions, and the frequent phrases further need to be selected based on human experiences and common terms in messages generated by monitoring tools that create the process log data.

Figure 6:
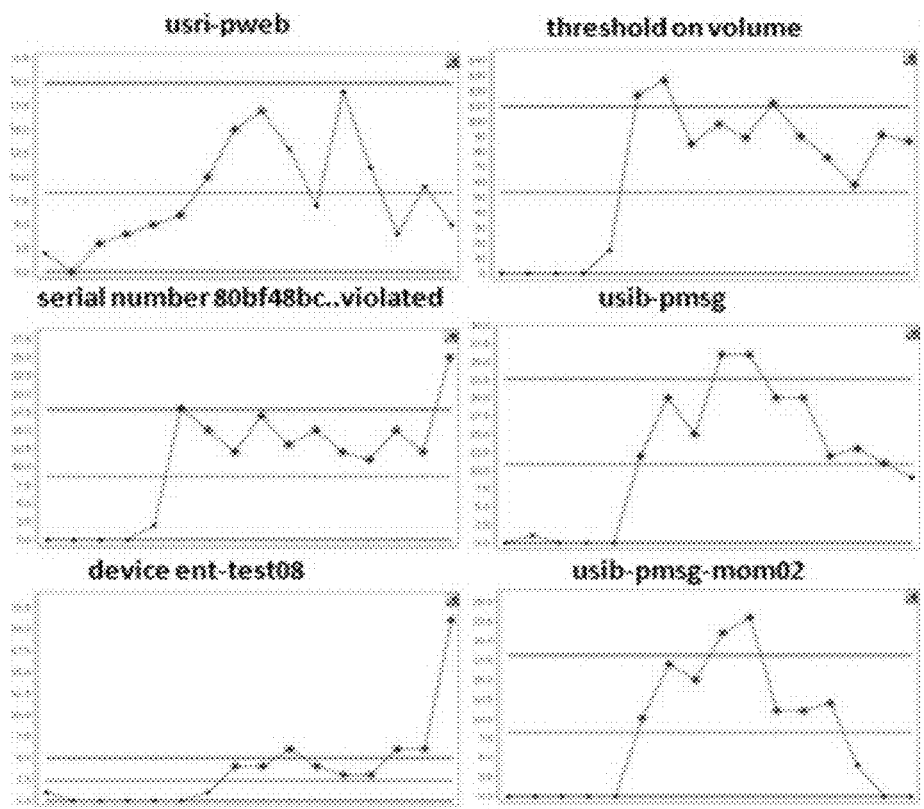
FIG. 6 is an example of process control charts for top six (6) exceptional phrases discovered from a Pareto analysis of unstructured process log data, in accordance with the embodiments of the present invention.

FIG. 6 is an example of process control charts for top six (6) exceptional phrases discovered from a Pareto analysis of unstructured process log data, in accordance with the embodiments of the present invention.

The process log data of FIG. 6 example comprises at least two (2) attributes of Summary and OpenDate, wherein Summary is a text description of the incident in natural language input in conjunction with system messages and status information and OpenDate is a first date info when the incident log was opened. The process log data is unstructured, meaning there is no classification/categorization in the logs data, which is equivalent to the textual logs provided for entity grouping in step 100 of FIG. 3 supra.

In contrast with conventional PBA based on classification shown in FIG. 5 supra, the example of FIG. 6 highlights specific phrases having an exception. Accordingly, highly frequent phrases having no exception can be easily discarded in the PBA of the present invention. Further, the high-volume phrases with exceptions specifies exact server names with problems such that the PBA system can trigger an alert with respect to the specified server, type of anomaly associated with a serial number, etc.

Figure 7:
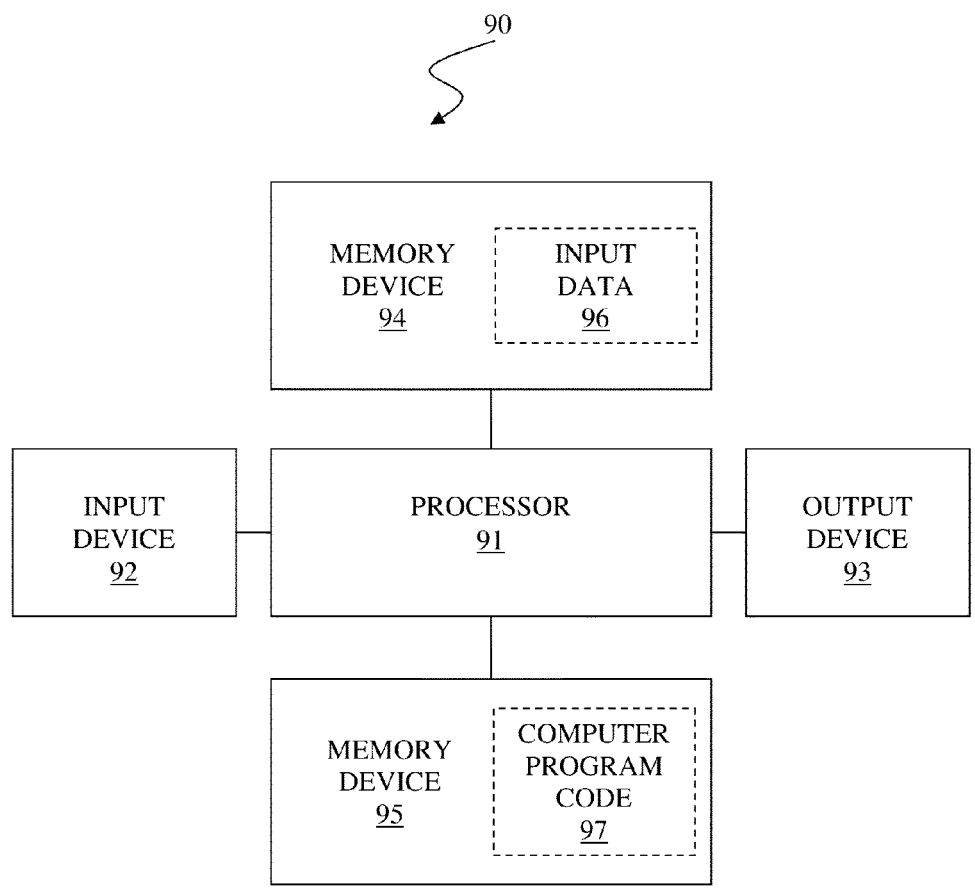
FIG. 7 illustrates a computer system used for detecting process variations based on textual logs, in accordance with the embodiments of the present invention.

FIG. 7 illustrates a computer system used for detecting process variations based on textual logs, in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VoIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for detecting process variations based on textual logs of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for detecting process variations based on textual logs.

In another embodiment, the invention provides a method that performs the process steps of the invention on a subscription, advertising and/or fee basis. That is, a service provider, such as a Solution Integrator, can offer to create, maintain, support, etc., a process for detecting process variations based on textual logs of the present invention. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represents a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for detecting a statistical variation of a process operating in an Information Technology (IT) delivery system from a textual log of the process, the method comprising:

grouping, by a process behavior analysis (PBA) engine, entities appearing in the textual log of the process based on a respective time series corresponding to each entity of said entities, wherein a data storage operatively coupled to the PBA engine stores the textual log of the process and at least one exception rule defining the statistical variation used by the PBA engine;

analyzing, by a processor of a computer system, statistical process behavior of the process by running the PBA engine with the entities from said grouping such that each entity of said entities is represented by a respective control chart associated with said each entity and such that the PBA engine is enabled to determine whether said each entity violates said at least one exception rule; and generating a PBA report for the process pursuant to a result from said analyzing, wherein the PBA report comprises data items selected from the group consisting of a first time window within which a first time series of a first entity of the entities in the textual log is being monitored by the PBA engine for the statistical variation, a second entity being grouped with the first entity, a first shift value for a first exception detected for the first entity, and combinations thereof.

2. The method of claim 1, said grouping comprising:

extracting the entities from the textual log of the process, wherein said each entity of the entities represents a respective phrase describing problems of the IT delivery system, wherein the PBA engine is monitoring the process running in the IT delivery system by use of the textual log;

extracting a respective time series corresponding to said each entity from the textual log, wherein the respective time series represents a respective sequence of data points associated with said each entity, as being measured at uniform time intervals such that the respective time series of said each entity demonstrates a respective statistical pattern of occurrences of said each entity in the textual log; and merging the second entity with the first entity upon determining that a second time series of the second entity is statistically similar to the first time series of the first entity, wherein statistical similarity is determined based on said at least one exception rule.

3. The method of claim 1, said analyzing comprising:

generating a first control chart corresponding to the first time series for the first entity, wherein the first control chart comprises a center mean line ($\overline{X}$), an upper control limit (UCL), and a lower control limit (LCL), wherein UCL=($\overline{X}$+3σ), wherein σ is a standard error, and wherein LCL=($\overline{X}$−3σ);

determining that the first entity violates the first exception according to said at least one exception rule;

identifying, responsive to said determining, the first exception type and the first time window;

calculating a first rank score of the first entity based on said identifying; and associating the first entity, the first exception type, the first time window, the first control chart, and the first rank score and subsequent storing the associated data items in the data storage.

4. The method of claim 3, wherein said at least one exception rule is represented on the first control chart, wherein a first exception rule of said at least one exception rule represents a first exception type comprising a data point of the first time series that is either greater than the UCL or less than the LCL, wherein a second exception rule of said at least one exception rule represents a second exception type wherein a predetermined number of consecutive data points of the first time series are either above $\overline{X}$ or below $\overline{X}$, wherein the predetermined number is selected from the group consisting of seven (7) and nine (9), wherein a third exception rule of said at least one exception rule represents a third exception type wherein six (6) or more consecutive data points of the first time series show a continuous increase or a continuous decrease, wherein a fourth exception rule of said at least one exception rule represents a fourth exception type wherein fourteen (14) or more consecutive data points of the first time series oscillate above and below $\overline{X}$, wherein a fifth exception rule of said at least one exception rule represents a fifth exception type wherein two (2) or more consecutive data points of the first time series are either above ($\overline{X}$+2σ) or below ($\overline{X}$−2σ), wherein a sixth exception rule said at least one exception rule represents a sixth exception type wherein four (4) or more consecutive data points of the first time series are either above ($\overline{X}$+σ) or below ($\overline{X}$−σ), wherein a seventh exception rule said at least one exception rule represents a seventh exception type wherein fifteen (15) or more consecutive data points of the first time series are between ($\overline{X}$−σ) and ($\overline{X}$+σ), wherein an eighth exception rule said at least one exception rule represents an eighth exception type wherein eight (8) or more consecutive data points of the first time series are either less than ($\overline{X}$−σ) or greater than ($\overline{X}$+σ).

5. The method of claim 1, said generating comprising:

assigning a respective category to each entity of the entities pursuant to respective exception type defined in said at least one exception rule, and a decision respective to each exception type indicating whether or not said each exception type defined in said at least one exception rule had been violated by respective entity;

determining a respective stability value associated with the first entity; and producing the PBA report with the respective category from said assigning, the decision respective to each exception type from said assigning, the respective stability value from said determining, and further data retrieved from the data storage for the data items selected for the PBA report.

6. A computer program product comprising:

a computer readable memory unit having a computer readable program code embodied therein, said computer readable program code containing instructions that perform detecting a statistical variation of a process operating in an Information Technology (IT) delivery system from a textual log of the process, said detecting comprising:

grouping, by a process behavior analysis (PBA) engine, entities appearing in the textual log of the process based on a respective time series corresponding to each entity of said entities, wherein a data storage operatively coupled to the PBA engine stores the textual log of the process and at least one exception rule defining the statistical variation used by the PBA engine;

analyzing statistical process behavior of the process by running the PBA engine with the entities from said grouping such that each entity of said entities is represented by a respective control chart associated with said each entity and such that the PBA engine is enabled to determine whether said each entity violates said at least one exception rule; and generating a PBA report for the process pursuant to a result from said analyzing, wherein the PBA report comprises data items selected from the group consisting of a first time window within which a first time series of a first entity of the entities in the textual log is being monitored by the PBA engine for the statistical variation, a second entity being grouped with the first entity, a first shift value for a first exception detected for the first entity, and combinations thereof.

7. The computer program product of claim 6, said grouping comprising:

extracting the entities from the textual log of the process, wherein said each entity of the entities represents a respective phrase describing problems of the IT delivery system, wherein the PBA engine is monitoring the process running in the IT delivery system by use of the textual log;

extracting a respective time series corresponding to said each entity from the textual log, wherein the respective time series represents a respective sequence of data points associated with said each entity, as being measured at uniform time intervals such that the respective time series of said each entity demonstrates a respective statistical pattern of occurrences of said each entity in the textual log; and merging the second entity with the first entity upon determining that a second time series of the second entity is statistically similar to the first time series of the first entity, wherein statistical similarity is determined based on said at least one exception rule.

8. The computer program product of claim 6, said analyzing comprising:

generating a first control chart corresponding to the first time series for the first entity, wherein the first control chart comprises a center mean line ($\overline{X}$), an upper control limit (UCL), and a lower control limit (LCL), wherein UCL=($\overline{X}$+3σ), wherein σ is a standard error, and wherein LCL=($\overline{X}$−3σ);

determining that the first entity violates the first exception according to said at least one exception rule;

identifying, responsive to said determining, the first exception type and the first time window;

calculating a first rank score of the first entity based on said identifying; and associating the first entity, the first exception type, the first time window, the first control chart, and the first rank score and subsequent storing the associated data items in the data storage.

9. The computer program product of claim 8, wherein said at least one exception rule is represented on the first control chart, wherein a first exception rule of said at least one exception rule represents a first exception type comprising a data point of the first time series that is either greater than the UCL or less than the LCL, wherein a second exception rule of said at least one exception rule represents a second exception type wherein a predetermined number of consecutive data points of the first time series are either above $\overline{X}$ or below $\overline{X}$, wherein the predetermined number is selected from the group consisting of seven (7) and nine (9), wherein a third exception rule of said at least one exception rule represents a third exception type wherein six (6) or more consecutive data points of the first time series show a continuous increase or a continuous decrease, wherein a fourth exception rule of said at least one exception rule represents a fourth exception type wherein fourteen (14) or more consecutive data points of the first time series oscillate above and below $\overline{X}$, wherein a fifth exception rule of said at least one exception rule represents a fifth exception type wherein two (2) or more consecutive data points of the first time series are either above ($\overline{X}$+2σ) or below ($\overline{X}$−2σ), wherein a sixth exception rule said at least one exception rule represents a sixth exception type wherein four (4) or more consecutive data points of the first time series are either above ($\overline{X}$+σ) or below ($\overline{X}$−σ), wherein a seventh exception rule said at least one exception rule represents a seventh exception type wherein fifteen (15) or more consecutive data points of the first time series are between ($\overline{X}$−σ) and ($\overline{X}$+σ), wherein an eighth exception rule said at least one exception rule represents an eighth exception type wherein eight (8) or more consecutive data points of the first time series are either less than ($\overline{X}$−σ) or greater than ($\overline{X}$+σ).

10. The computer program product of claim 6, said generating comprising:

assigning a respective category to each entity of the entities pursuant to respective exception type defined in said at least one exception rule, and a decision respective to each exception type indicating whether or not said each exception type defined in said at least one exception rule had been violated by respective entity;

determining a respective stability value associated with the first entity; and producing the PBA report with the respective category from said assigning, the decision respective to each exception type from said assigning, the respective stability value from said determining, and further data retrieved from the data storage for the data items selected for the PBA report.

11. A computer system comprising a processor, a memory coupled to the processor, and a computer readable storage device coupled to the processor, said storage device containing program code configured to be executed by the processor via the memory to implement detecting a statistical variation of a process operating in an Information Technology (IT) delivery system from a textual log of the process, said detecting comprising:

grouping, by a process behavior analysis (PBA) engine, entities appearing in the textual log of the process based on a respective time series corresponding to each entity of said entities, wherein a data storage operatively coupled to the PBA engine stores the textual log of the process and at least one exception rule defining the statistical variation used by the PBA engine;

analyzing statistical process behavior of the process by running the PBA engine with the entities from said grouping such that each entity of said entities is represented by a respective control chart associated with said each entity and such that the PBA engine is enabled to determine whether said each entity violates said at least one exception rule; and generating a PBA report for the process pursuant to a result from said analyzing, wherein the PBA report comprises data items selected from the group consisting of a first time window within which a first time series of a first entity of the entities in the textual log is being monitored by the PBA engine for the statistical variation, a second entity being grouped with the first entity, a first shift value for a first exception detected for the first entity, and combinations thereof.

12. The computer system of claim 11, said grouping comprising:

extracting the entities from the textual log of the process, wherein said each entity of the entities represents a respective phrase describing problems of the IT delivery system, wherein the PBA engine is monitoring the process running in the IT delivery system by use of the textual log;

extracting a respective time series corresponding to said each entity from the textual log, wherein the respective time series represents a respective sequence of data points associated with said each entity, as being measured at uniform time intervals such that the respective time series of said each entity demonstrates a respective statistical pattern of occurrences of said each entity in the textual log; and merging the second entity with the first entity upon determining that a second time series of the second entity is statistically similar to the first time series of the first entity, wherein statistical similarity is determined based on said at least one exception rule.

13. The computer system of claim 11, said analyzing comprising:

generating a first control chart corresponding to the first time series for the first entity, wherein the first control chart comprises a center mean line ($\overline{X}$), an upper control limit (UCL), and a lower control limit (LCL), wherein UCL=($\overline{X}$+3σ), wherein σ is a standard error, and wherein LCL=($\overline{X}$−3σ);

determining that the first entity violates the first exception according to said at least one exception rule;

identifying, responsive to said determining, the first exception type and the first time window;

calculating a first rank score of the first entity based on said identifying; and associating the first entity, the first exception type, the first time window, the first control chart, and the first rank score and subsequent storing the associated data items in the data storage.

14. The computer system of claim 13, wherein said at least one exception rule is represented on the first control chart,
wherein a first exception rule of said at least one exception rule represents a first exception type comprising a data point of the first time series that is either greater than the UCL or less than the LCL,
wherein a second exception rule of said at least one exception rule represents a second exception type wherein a predetermined number of consecutive data points of the first time series are either above $\overline{X}$ or below $\overline{X}$, wherein the predetermined number is selected from the group consisting of seven (7) and nine (9),
wherein a third exception rule of said at least one exception rule represents a third exception type wherein six (6) or more consecutive data points of the first time series show a continuous increase or a continuous decrease,
wherein a fourth exception rule of said at least one exception rule represents a fourth exception type wherein fourteen (14) or more consecutive data points of the first time series oscillate above and below $\overline{X}$,
wherein a fifth exception rule of said at least one exception rule represents a fifth exception type wherein two (2) or more consecutive data points of the first time series are either above $(\overline{X}+2\sigma)$ or below $(\overline{X}-2\sigma)$,
wherein a sixth exception rule said at least one exception rule represents a sixth exception type wherein four (4) or more consecutive data points of the first time series are either above $(\overline{X}+\sigma)$ or below $(\overline{X}-\sigma)$,
wherein a seventh exception rule said at least one exception rule represents a seventh exception type wherein fifteen (15) or more consecutive data points of the first time series are between $(\overline{X}-\sigma)$ and $(\overline{X}+\sigma)$,
wherein an eighth exception rule said at least one exception rule represents an eighth exception type wherein eight (8) or more consecutive data points of the first time series are either less than $(\overline{X}-\sigma)$ or greater than $(\overline{X}+\sigma)$.

15. The computer system of claim 11, said generating comprising:
assigning a respective category to each entity of the entities pursuant to respective exception type defined in said at least one exception rule, and a decision respective to each exception type indicating whether or not said each exception type defined in said at least one exception rule had been violated by respective entity;
determining a respective stability value associated with the first entity; and
producing the PBA report with the respective category from said assigning, the decision respective to each exception type from said assigning, the respective stability value from said determining, and further data retrieved from the data storage for the data items selected for the PBA report.

16. A process for supporting computer infrastructure, said process comprising providing at least one support service for at least one of creating, integrating, hosting, maintaining, and deploying computer-readable code in a computing system, wherein the code in combination with the computing system is capable of performing detecting a statistical variation of a process operating in an Information Technology (IT) delivery system from a textual log of the process, said detecting comprising:
grouping, by a process behavior analysis (PBA) engine, entities appearing in the textual log of the process based on a respective time series corresponding to each entity of said entities, wherein a data storage operatively coupled to the PBA engine stores the textual log of the process and at least one exception rule defining the statistical variation used by the PBA engine;
analyzing, by a processor of a computer system, statistical process behavior of the process by running the PBA engine with the entities from said grouping such that each entity of said entities is represented by a respective control chart associated with said each entity and such that the PBA engine is enabled to determine whether said each entity violates said at least one exception rule; and
generating a PBA report for the process pursuant to a result from said analyzing, wherein the PBA report comprises data items selected from the group consisting of a first time window within which a first time series of a first entity of the entities in the textual log is being monitored by the PBA engine for the statistical variation, a second entity being grouped with the first entity, a first shift value for a first exception detected for the first entity, and combinations thereof.

17. The process of claim 16, said grouping comprising:
extracting the entities from the textual log of the process, wherein said each entity of the entities represents a respective phrase describing problems of the IT delivery system, wherein the PBA engine is monitoring the process running in the IT delivery system by use of the textual log;
extracting a respective time series corresponding to said each entity from the textual log, wherein the respective time series represents a respective sequence of data points associated with said each entity, as being measured at uniform time intervals such that the respective time series of said each entity demonstrates a respective statistical pattern of occurrences of said each entity in the textual log; and
merging the second entity with the first entity upon determining that a second time series of the second entity is statistically similar to the first time series of the first entity, wherein statistical similarity is determined based on said at least one exception rule.

18. The process of claim 16, said analyzing comprising:
generating a first control chart corresponding to the first time series for the first entity, wherein the first control chart comprises a center mean line ($\overline{X}$), an upper control limit (UCL), and a lower control limit (LCL), wherein UCL=$(\overline{X}+3\sigma)$, wherein $\sigma$ is a standard error, and wherein LCL=$(\overline{X}-3\sigma)$;
determining that the first entity violates the first exception according to said at least one exception rule;
identifying, responsive to said determining, the first exception type and the first time window;
calculating a first rank score of the first entity based on said identifying; and
associating the first entity, the first exception type, the first time window, the first control chart, and the first rank score and subsequent storing the associated data items in the data storage.

19. The process of claim 18, wherein said at least one exception rule is represented on the first control chart,
wherein a first exception rule of said at least one exception rule represents a first exception type comprising a data point of the first time series that is either greater than the UCL or less than the LCL,
wherein a second exception rule of said at least one exception rule represents a second exception type wherein a predetermined number of consecutive data points of the first time series are either above $\overline{X}$ or below $\overline{X}$, wherein the predetermined number is selected from the group consisting of seven (7) and nine (9), wherein a third exception rule of said at least one exception rule represents a third exception type wherein six (6) or more consecutive data points of the first time series show a continuous increase or a continuous decrease, wherein a fourth exception rule of said at least one exception rule represents a fourth exception type wherein fourteen (14) or more consecutive data points of the first time series oscillate above and below $\overline{X}$, wherein a fifth exception rule of said at least one exception rule represents a fifth exception type wherein two (2) or more consecutive data points of the first time series are either above ($\overline{X}+2\sigma$) or below ($\overline{X}-2\sigma$), wherein a sixth exception rule said at least one exception rule represents a sixth exception type wherein four (4) or more consecutive data points of the first time series are either above ($\overline{X}+\sigma$) or below ($\overline{X}-\sigma$), wherein a seventh exception rule said at least one exception rule represents a seventh exception type wherein fifteen (15) or more consecutive data points of the first time series are between ($\overline{X}-\sigma$) and ($\overline{X}+\sigma$), wherein an eighth exception rule said at least one exception rule represents an eighth exception type wherein eight (8) or more consecutive data points of the first time series are either less than ($\overline{X}-\sigma$) or greater than ($\overline{X}+\sigma$).

20. The process of claim 16, said generating comprising:

assigning a respective category to each entity of the entities pursuant to respective exception type defined in said at least one exception rule, and a decision respective to each exception type indicating whether or not said each exception type defined in said at least one exception rule had been violated by respective entity;

determining a respective stability value associated with the first entity; and producing the PBA report with the respective category from said assigning, the decision respective to each exception type from said assigning, the respective stability value from said determining, and further data retrieved from the data storage for the data items selected for the PBA report.

* * * * *